(12) United States Patent  (10) Patent No.: US 9,369,471 B2
Zent et al.  (45) Date of Patent: Jun. 14, 2016

(54) INTERACTION PRIVACY IN A DEFAULT NETWORK

(71) Applicant: Foxwordy, Inc., San Carlos, CA (US)

(72) Inventors: Monica Zent, Sunnyvale, CA (US); Robert Schmitt, Santa Barbara, CA (US)

(73) Assignee: FOXWORDY INC., San Carlos, CA (US)

( * ) Notice: Subject to any disclaimer, the term of this patent is extended or adjusted under 35 U.S.C. 154(b) by 222 days.

(21) Appl. No.: 14/188,574

(22) Filed: Feb. 24, 2014

(65) Prior Publication Data

US 2015/0101022 A1  Apr. 9, 2015

Related U.S. Application Data

(60) Provisional application No. 61/889,008, filed on Oct. 9, 2013.

(51) Int. Cl.
*G06F 21/00* (2013.01)
*H04L 29/06* (2006.01)
*G06F 21/30* (2013.01)
*G06F 21/31* (2013.01)

(52) U.S. Cl.
CPC .............. *H04L 63/104* (2013.01); *G06F 21/30* (2013.01); *G06F 21/31* (2013.01); *H04L 63/0407* (2013.01)

(58) Field of Classification Search
CPC ......... G06F 21/30; G06F 21/31; G06F 21/62; G06F 21/6209; G06F 21/6218; G06F 21/6245
See application file for complete search history.

(56) References Cited

U.S. PATENT DOCUMENTS 8,832,567 B1 *  9/2014  Jing ...................... G06F 3/0486
                                                    715/738
2009/0070334 A1 *  3/2009  Callahan ............... G06F 21/604

* cited by examiner

*Primary Examiner* — Edward Zee
(74) *Attorney, Agent, or Firm* — Fenwick & West LLP (57) ABSTRACT

A system and a method are disclosed for controlling access to content in a default network computing system. The method includes receiving a request for a data item from a user, retrieving privacy settings associated with the data item, and retrieving groups associated with the requesting user's user profile. An access level is determined based on the groups associated with the requesting user profile and the retrieved privacy setting. The data item is redacted based on the determined access level and then provided for display to the requesting user.

20 Claims, 8 Drawing Sheets

| 400 | | | |
|---|---|---|---|
| Visibility Level 402 | Visibility Description 404 | Time Created 406 | Time Updated 408 |

FIG. 4

| 500 | | | | | | | |
|---|---|---|---|---|---|---|---|
| User ID 502 | Activity Feed Privacy 504 | Picture Privacy 506 | Connection Privacy 508 | Reputation Privacy 510 | Anonymity Level 512 | Contact Detail Privacy 514 | Time Created 516 | Time Updated 518 |

FIG. 5

| 600 | | | | | | |
|---|---|---|---|---|---|---|
| Item ID 602 | Item Type 604 | User ID 606 | Anonymity Level 608 | Visibility Level 610 | Time Created 612 | Time Updated 614 |

Who can see your reputation?

Choose who can see your reputation on Foxwordy.

✓ Everyone
My Connections Only
In-House Network
Only Me

838    How Do You Appear To Others

Choose the setting for how you will appear on all activity you engage in on Foxwordy.

838A — (Recommended)
Robert Schmitt
838B — Principal, RESolution Graphics Inc.
Principal
Santa Barbara
838C — Foxwordy Member
838D — SAVE SETTINGS or Cancel

Hide contact details

839A — ☐ Yes I would like to hide my contact details from my public profile

839B — SAVE SETTINGS or Cancel

INTERACTION PRIVACY IN A DEFAULT NETWORK

CROSS REFERENCE TO RELATED APPLICATIONS

This application claims the benefit of U.S. Provisional Application No. 61/889,008, filed Oct. 9, 2013, which is incorporated by reference in its entirety.

BACKGROUND

1. Field of Art

The disclosure generally relates to the field of social networking, and more particularly, to controlling access to user-generated content in a social network computing system.

2. Description of the Related Art

In a professional work environment, professionals may seek advice, ask questions, or share documents with colleagues. Because interactions within the professional work environment happen in person, by phone, or by email, participants in an interaction know each other's identities. Although knowing an interlocutor's identity may be beneficial for ensuring quality and accountability, non-anonymity may stifle interactions regarding sensitive matters. Some licensed professionals may be constrained by avoiding the appearance of giving advice in an informal situation. Additionally, the pool of colleagues available with which to discuss matters is limited. Finding someone with the knowledge to handle a rare, complicated, or special circumstance may be a matter of luck when dealing with traditional professional contacts. Currently, no social network adequately fits the needs of professionals for a discrete method of interacting with a wider range of colleagues than is possible without technology.

BRIEF DESCRIPTION OF DRAWINGS

The disclosed embodiments have other advantages and features, which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (and method, and computer readable storage medium) includes controlling access to content and user information in a default network for users of a social network computing system. A default network computing system contains computer systems configured as client computer systems (or client devices or clients) and server computer systems (or server devices or servers) connected by a network. Users of the default network computing environment may upload data including personal information and content to a server and may view data uploaded by other users. The default network server contains storage modules to organize uploaded data for manipulation and retrieval as well as engines to process and retrieve data in a form useful to the user. Users are organized into one or more default networks, which contain users sharing one or more attributes. Users may also create connections with other user profiles with which they wish to interact.

When uploading content to the default network, users may specify privacy settings that indicate which users may view the uploaded content. Users may make content they upload public or may limit access to user profiles with which they are connected or share a default network. Users may additionally specify settings governing use of personal information. Users may control availability of information on their user profiles as well as identifying information associated with their interactions on the default network. Also disclosed is a configuration for ensuring that content is accessed by viewers as specified by privacy settings associated with the content. The configuration also removes information that an uploading user of the content intends to keep private. Example user interfaces for specifying privacy settings are also disclosed.

Computing Machine Architecture

Figure 1:
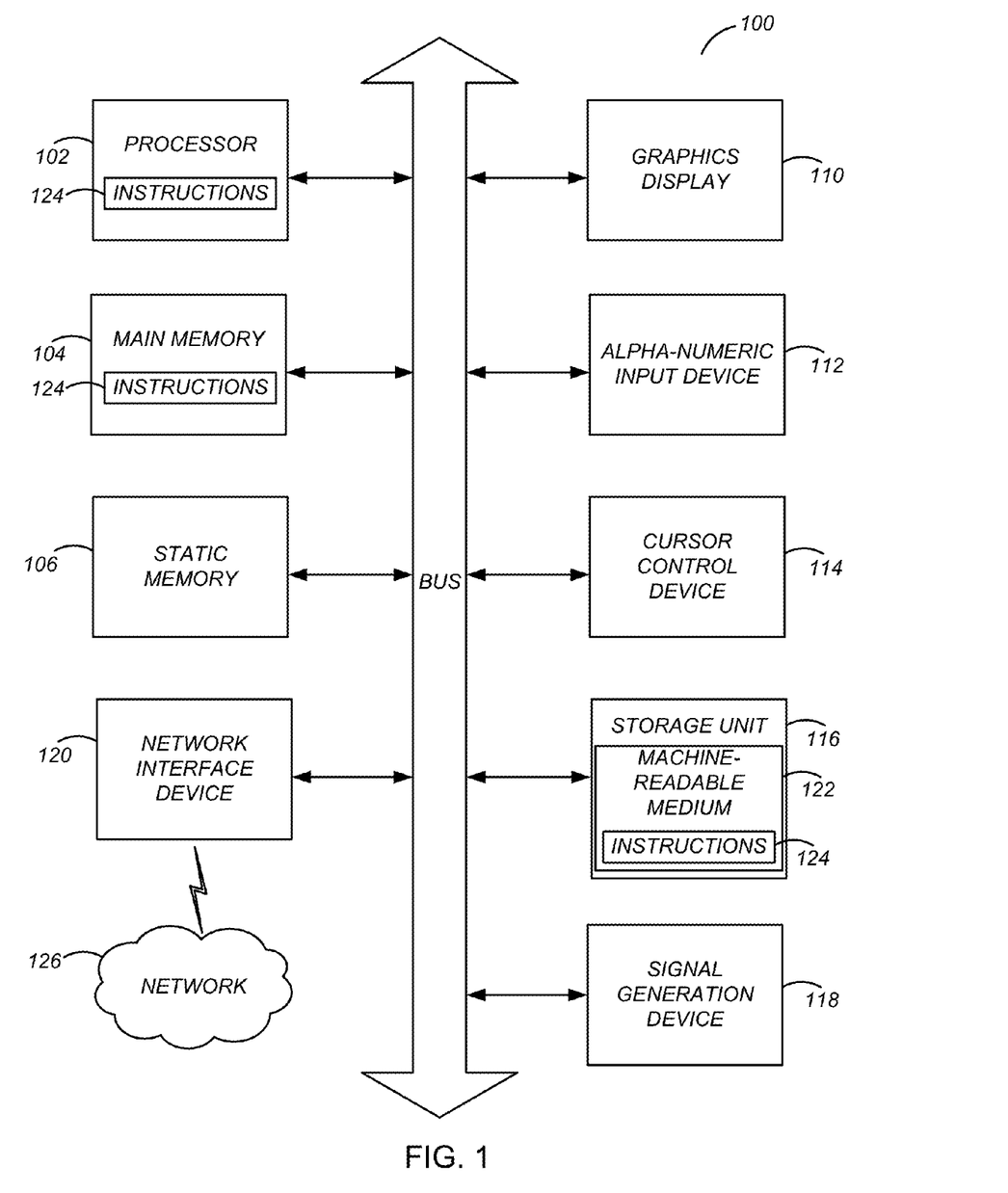
FIG. 1 illustrates one embodiment of components of an example machine able to read instructions from a machine-readable medium and execute them in a processor (or controller).

Turning first to FIG. 1, it is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine (or device) or a client machine (or device) in a server-client network environment, or as a peer machine in a peer-to-peer (or distributed) network environment.

The machine may be a server device or computer or a client device or computer that can be structured as a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 (e.g., WiFi, 3G, 4G, Ethernet, digital subscriber line (DSL), fiber optic network) via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Example Architectural Configuration

Figure 2:
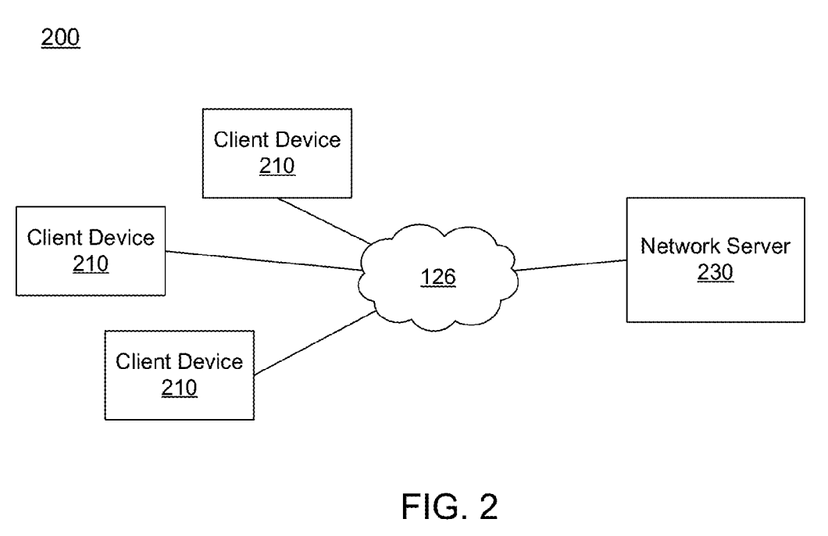
FIG. 2 illustrates an architectural configuration used to implement one example embodiment of the default network computing system.

Referring now to FIG. 2, illustrated is a block diagram of a default network environment 200 in an example embodiment. The default network environment 200 includes one or more client device 210 (e.g., a personal computer, a tablet, a smartphone, a cellular phone, a terminal, a smart television, a personal digital assistant (PDA), a smart watch, a wearable computer), a network 126, and a network server 230. A computer system 100 may be used in some embodiments of the client device 210 and/or network server 230. The one or more client devices 210 are coupled to the network 126, which is in turn coupled to the network server 230. In an alternate embodiment, additional networks 126, client devices 210, and/or network servers 230 may be present. For example, an additional network server 230 may act as a proxy server between the one or more client devices 210 and another network server 230.

The one or more client devices 210 may be used by users to view, upload, submit, and interact with content in the default network. For example, a user may provide a numerical rating of content uploaded by another user. Users of the one or more client devices 210 may create user profiles and may connect their user profiles on the default network to other user profiles on the default network. Users of the one or more client devices 210 may declare or modify preferences governing their user profile and/or content they upload. For example, a user may limit who may view content that the user has uploaded. In an example embodiment, HyperText Markup Language (HTML) code is used to display content on the client device 210. Alternate embodiments may use other data-interchange formats such as Extensible Markup Language (XML) or JavaScript Object Notation (JSON). A client device 210 may be associated with a single user profile, or the client device 210 may be associated with multiple user profiles. In an embodiment, a user may access their user profile through multiple client devices 210.

In one embodiment, the network server 230 stores data about the default network including user profiles, content, and connections between users. The network server 230 may retrieve and/or process data as requested by users of client devices 210. In an embodiment, HyperText Transfer Protocol (HTTP) may be used to exchange or transfer data between a network server 230 and a client device 210 using HTTP methods including GET, POST, PUT, and DELETE. In an alternate embodiment, some or all of the processing and/or storing functions of the network server 230 may be performed by one or more client devices 210 alone or in combination with a network server 230. In an alternate embodiment, a single device may implement components of a client device 210 and a network server 230.

Figure 3:
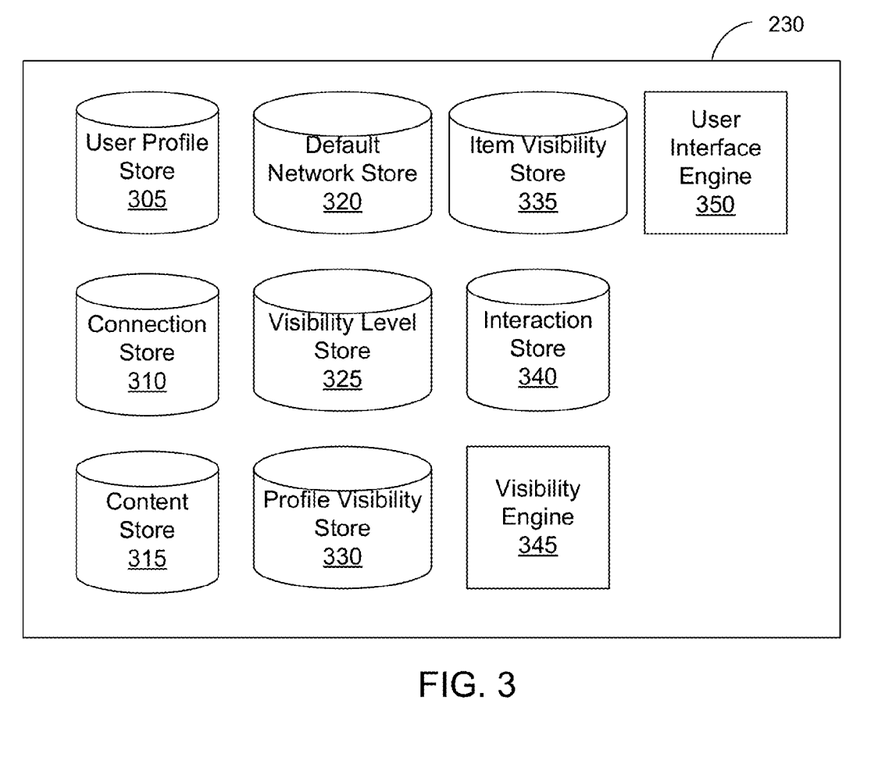
FIG. 3 illustrates a block diagram of a network server used to implement interaction privacy in the default network computing system in one embodiment.

Referring now to FIG. 3, illustrated is a block diagram of a network server 230 used to implement the default network in one embodiment. The network server 230 contains a user profile store 305, a connection store 310, a content store 315, a default network store 320, a visibility level store 325, a profile visibility store 330, an item visibility store 335, an interaction store 340, a visibility engine 345, and a user interface engine 350. The user profile store 305 contains information that a user has provided (e.g., a user profile created by a user). Example information in a user profile entry of the user profile store 305 may include a unique user identification (ID), first name, last name, location, company, title, account type, expertise, and practice area. Other information in a user profile may include previous work history, education, honors, awards, associations, languages, certifications, contact details, a profile image uploaded by the user, and a written biographical summary or statement of purpose submitted by the user.

The connection store 310 stores one or more connections made between users using their user profiles. In an embodiment, connections are stored as connection entries between a user profile and another user profile. User profiles that are connected may be granted additional access to each other's user profiles or content that has been uploaded. Connections may be used to create an individualized activity feed for a user that summarizes recent actions taken by connections and other relevant users. An example activity feed may include recently uploaded excerpted content items, recent comments on excerpted content items, requests, referrals, or questions. Connections may be additionally be used to suggest new connections (e.g., based on connections in common). User profiles that are connected to a particular user profile may have additional opportunities for interaction with the particular user profile such as suggesting new connections, sending messages, requests, referrals, content items, or questions, for example. A user profile connected with a particular user profile may have additional access to the particular user's excerpted content and/or user profile page.

The content store 315 stores excerpted content items uploaded by users of the default network computing system. In one embodiment, excerpted content is stored as text or as a text file, but other embodiments may contain content including images, videos, and/or audio files. Excerpted content items in the content store 315 may be accessed through a search interface or other links in the user interface. Excerpted content items may be displayed by the user interface engine 350. In an embodiment, excerpted content items may be uploaded as "Clauses," defined herein as text entered into the default network user interface, and "Documents," defined herein as files uploaded through the default network user interface. Example information stored in a content store entry may include content text, content title, a user identification (ID) of a user profile that created the content item, time created, time stored, time updated, time published, content state, content identification (ID), a content key generated by hashing the content text, content metadata, and content file size. The excerpted content store 315 may be accessed by the user interface engine 350.

The default network store 320 stores data relating to a default network. A user profile is associated with a default network based on one or more attributes a user profile shares with other user profiles in the default network. An example entry in the default network store 320 may include a unique identifier for the default network, user profiles associated with the default network, and common attributes of those user profiles associated with the default network. In an alternate embodiment, a user profile may be placed in one or more default networks according to one or more attributes chosen by a user who created the user profile. Attributes of a user profile may include practice area, location, expertise, occupation, industry, sub-industry, employer, and account type. For example, a user profile may be placed in the same default network as other users having the same account type, location, and practice area. The default network may be used to suggest additional connections for a user profile (i.e., other user profiles in the user's default network). Membership in a default network may grant access to user profiles of member users in the default network or excerpted content items or interactions uploaded by member users in the default network. In an embodiment, the default network may be used to generate an activity feed listing excerpted content uploaded to other user profiles, interactions with excerpted content, and between user profiles.

The visibility level store 325 defines one or more privacy categories. A privacy category may be associated with an item such as a user profile, an interaction, a connection invitation, or an excerpted content item. Interactions include comments, questions, referrals, discussions, answers, and requests. A visibility level may define which user profiles may see an item created by a particular user profile. Example visibility levels include everyone (e.g., all user profiles may see the item), connections only (e.g., user profiles connected with the particular user profile may see the item), default network (e.g., user profiles in the same default network as the particular user profile may see the item), invite only (e.g., user profiles are chosen that may view the item), user only (e.g., only the user profile that uploaded an item may view the item), and hidden (e.g., no user may view the item). The visibility level store 325 is referenced by the profile visibility store 330 and the item visibility store 335, and may be accessed by the visibility engine 345 or the user interface engine 350.

The profile visibility store 330 defines privacy settings associated with a particular user profile. Example privacy settings may include settings on a user profile's activity feed, profile image, connections, reputation (a numerical quantification of a user profile's activity level and perception within the default network environment), anonymity level, and contact detail privacy. The privacy settings may include some privacy settings that apply by default but may be overruled in some situations by a user. For example, a user may choose a privacy setting designating that excerpted content uploaded by the user has a default network visibility level unless that user specifies a different privacy setting for a particular document. Anonymity level privacy settings control how a user profile appears to other users. For example, a user can choose full anonymity, non-anonymity, or partial anonymity (e.g., name and company are hidden, but job title and location are displayed). The profile visibility store 330 may be accessed by the visibility engine 345 or the user interface engine 350.

The item visibility store 335 defines the visibility level for a particular item. Items may include interactions between user profiles or interactions with excerpted content items. Interactions having an associated visibility level defined in the visibility store 335 may include questions, referrals, discussions, answers, and requests. Other interactions such as comments, likes, favorites, ratings, shares, searches, or views may have visibility levels defined according to a user profile's entry in the profile visibility store 330. For example, comments on an excerpted content item may be visible to user profiles that may view the excerpted content item. Likes, favorites, and ratings, for example, may be visible in aggregate to user profiles that may an excerpted content item, but the individual user profiles contributing to the aggregate may be anonymous. In an embodiment, searches and views by a user profile are hidden from other user profiles. The item visibility store is accessed by the visibility engine 345 and the user interface engine 350.

The interaction store 340 records interactions between user profiles. For example, the interaction store may 340 record when a user chooses to follow another user's user profile, to state interest in another user's user profile, to state another user profile as a favorite, to share excerpted content with a user profile, to comment on excerpted content, to rate excerpted content, up vote or like excerpted content, to make or fulfill a request, to ask or answer a question, to request or make a referral, to search for content, to search for a user profile, or to view content. Entries in the interaction store 340 may include fields identifying the interaction type, an interaction identification (ID), a user ID of the user profile that initiated the interaction, a user ID of a user profile at which an interaction is directed, a time the interaction occurred, a time the interaction was updated, an interaction ID corresponding to another interaction responsive to the interaction, a message included in the interaction, and other fields relevant to the particular interaction. The interaction store 340 may be accessed by the user interface engine 350 to generate user interaction histories or to suggest connections or excerpted content to a user profile.

The visibility engine 345, which may be configured with elements similar to the computer system 100, determines which users may see items such as interactions, excerpted content items, user profile information, and it determines how much data the item contains is available for display to a user. In an embodiment, the visibility engine 345 receives requests from the user interface engine 350 regarding an item. The visibility engine may check the visibility level store 325, the profile visibility store 330, the item visibility store 335, or a combination thereof to determine which user profiles may see the item. If a user profile may see an item, the visibility engine 345 may further determine which information in an item may be displayed to the user profile that may see the item. For example, an excerpted content item may have a visibility level set to default network, and the user who uploaded the excerpted content item may have specified partial anonymity. In the example, visibility engine 345 would determine which user profiles may see the excerpted content item by retrieving user profiles in the uploading user profile's default network. In the example, the visibility engine 345 would further determine that those in the user profile's default network would have access to the uploading user profile's location and title but not the uploading user profile's name and company.

The user interface engine 350, which may be configured with elements similar to the computer system 100, creates interfaces to provide for display on a client device 210. Example interfaces may be structured to display a user profile, connections of a user profile, pending connections, potential connections, connections in a default network, excerpted content submitted by a user profile, interactions between one user profile and another user profile, and/or aggregations of user interactions. Example interfaces may be structured to display data passively and/or accept input from the user of a client device 210. The user interface engine 350 may retrieve, store, and/or modify data from the user profile store 305, the connection store 310, the content store 315, the default network store 320, the visibility level store 325, the profile visibility store 330, the item visibility store 335, and/or the interaction store 340. The user interface engine 350 may provide data and/or inputs to the visibility engine 345.

The network server 230 may contain additional modules, engines, or stores. For example, the network server may include a file store to store the original files for uploaded Documents. The network server may include a connection invitations store to track pending connection invitations. As another example, the network server 230 may contain a content misuse table, which contains reports from users of inappropriate or confidential content. In an embodiment, the network server may contain additional tables to categorize excerpted content items, such as attributes associated with an excerpted content item. The network server 230 may contain additional engines for handling connection requests, for uploading excerpted content to the content store 315, for creating and modifying default networks in the default network store 320, or for calculating user reputation.

Visibility and Privacy Data

Figure 4:
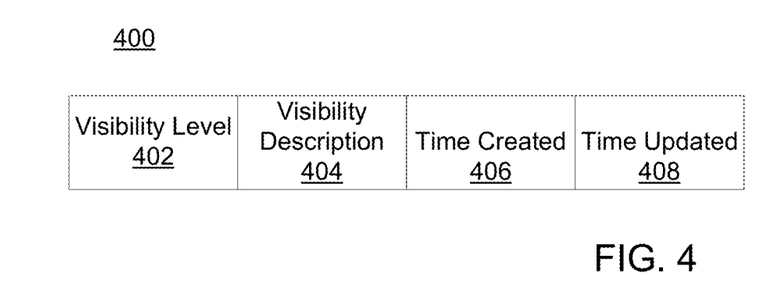
FIG. 4 illustrates an entry in a privacy category store in one embodiment.
Figure 5:
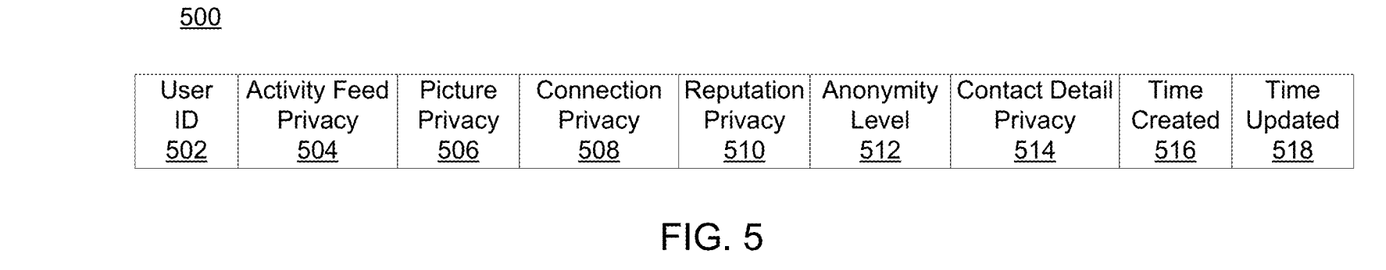
FIG. 5 illustrates an entry in a profile privacy store in one embodiment.
Figure 6:
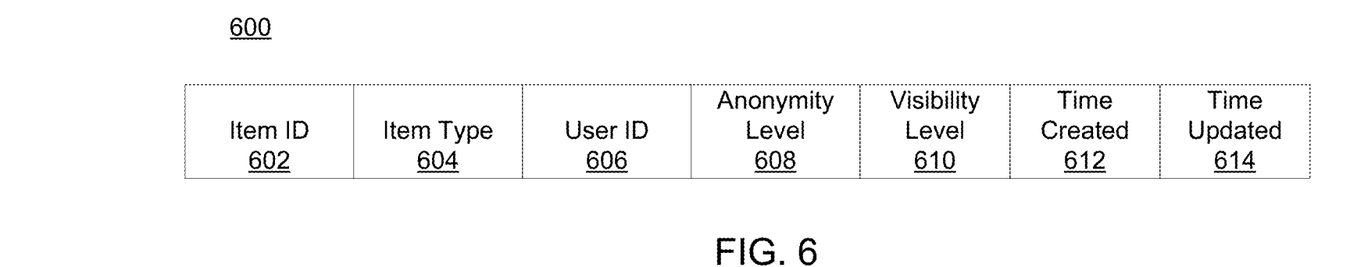
FIG. 6 illustrates an entry in an interaction privacy store in one embodiment.

Referring now to FIGS. 4 through 6, illustrated are entries for tracking visibility and privacy settings for users and for items in the default network computing system. In one embodiment, data stores (e.g., 305, 310, 315, 320, 325, 330, 335, 340) are implemented in a Relational Database Management System (RDBMS) implemented in a programming language such as Structured Query Language (SQL), PostgreSQL, MySQL, SQL Server, or Oracle. An example visibility level entry 400 implements the visibility level store 325 and contains fields including a visibility level field 402, a visibility description field 404, a time created field 406, and a time updated field 408. The visibility level field 402 indicates a name of a visibility level available for use in entries of the profile visibility store 330 and entries in the item visibility store 335. Example visibility levels include everyone (e.g., all user profiles may see the item), connections only (e.g., user profiles connected with the particular user profiles may see the item), default network (e.g., user profiles in the same default network as the particular user may see the item), and invite only (e.g., the particular user chooses specific user profiles that may see the item).

The visibility description field 404 describes the relationship between the user profiles that may see an item and the user profile that created the item. The visibility description 404 may be used by the user interface engine 350 to indicate to users what an available visibility level denotes. The time created field 406 indicates the time at which a visibility level entry 400 was created. The time updated field 408 indicates the time at which a visibility level entry 400 was last updated. In an embodiment, visibility level entries 400 are created by administrators or designers of the default network computing system, but in an alternate embodiment, visibility level entries 400 may be created by users, either explicitly or implicitly. For example, choosing an invite only visibility level may create a custom visibility level based on the user profiles invited to see a content item.

An example profile visibility entry 500 implements the profile visibility store 330 and contains fields including a user identification (ID) field 502, an activity feed privacy field 504, a picture privacy field 506, a connection privacy field 508, a reputation privacy field 510, an anonymity level field 512, a contact detail privacy field 514, a time created field 516, and a time updated field 518. The user ID field 502 specifies a user who may modify the profile visibility entry 500. The user ID field 502 matches the user ID in the specified user profile's entry in the user profile store 305. The activity feed privacy field 504 specifies a visibility level determining which user profiles may see activities performed by the specified user profile. Example activities include creating an excerpted content item, question, referral, request, or discussion, or interacting with an item by answering a question or request, making a referral, or liking, rating, commenting, or marking as a favorite an excerpted content item.

The picture privacy field 506 specifies a visibility level for a photo uploaded to the specified user profile as a profile image. If the visibility level in the picture privacy field 506 includes a viewing user's user profile, then the viewing user may see the profile image alongside the name of the specified user profile, in an embodiment. If the visibility level does not include a viewing user's user profile, then the viewing user sees a generic outline of a person, in an embodiment. The connection privacy field 508 specifies a visibility level for a user profile's connections. If the visibility level in the connection privacy field 508 includes a viewing user's user profile, then the viewing user may see connections of the specified user profile, in an embodiment. The reputation privacy field 510 specifies a visibility level for a user profile's reputation score. If the reputation privacy field 510 specifies a visibility level that includes a viewing user's user profile, the viewing user may see the specified user profile's reputation as well as the specified user profile in displayed reputation rankings.

The anonymity level field 512 specifies how much identifying information viewing users may see in references to the specified user profile. In an embodiment, a user can choose full anonymity, non-anonymity (e.g., name, location, job title, and/or company displayed), or partial anonymity (e.g., job title and location). In an embodiment, the anonymity level field 512 affects how the specified user profile appears to users who see the specified user profile's interactions, uploaded excerpted content, and user profile page. The contact detail privacy field 514 specifies a visibility level for a user profile's contact details (e.g., phone number, address, email address, website). If the contact detail privacy field 514 specifies a visibility level that includes a viewing user's user profile, the viewing user may see contact details provided by the specified user when viewing the user profile of the specified user. In one embodiment, a user may choose to hide contact details from the user's user profile. The time created field 516 indicates the time at which the profile visibility entry 500 was created. The time updated field 518 indicates the time at which the profile visibility entry 500 was last updated. In an alternate embodiment, the profile visibility entry 500 may contain additional fields specifying visibility levels for more specific categories of interactions or for other actions of a user profile within the default network computing system. The profile visibility entry 500 may also contain fields specifying privacy settings governing which user profiles may contact a user's user profile (e.g., through the default networking computer system, through an email, through a connection request).

An example item visibility entry 600 implements the item visibility store 335 and contains fields including an item identification (ID) field 602, an item type field 604, a user identification (ID) field 606, an anonymity level field 608, a visibility level field 610, a time created field 612, and a time updated field 614. The item ID field 602 identifies an item. In an embodiment, the item ID field 602 matches an interaction ID in the interaction store 340. The item type field 604 specifies the type of item described by the item visibility entry 600. Example items may include an excerpted content item, a question, a referral, a request, or a discussion. The user ID field 606 specifies the user profile that created the identified item and matches the user ID corresponding to the creating user's entry in the user profile store 305. The anonymity level field 608 specifies how much identifying information viewing users may see in the identified item's reference to the creating user profile. In an embodiment, the creating user can choose full anonymity, non-anonymity (e.g., name, location, job title, and/or company displayed), or partial anonymity (e.g., job title and location). The anonymity level field 608 may override the anonymity level field 512 in the user's profile visibility entry 500.

The visibility level field 610 indicates the visibility level associated with the identified item. If the visibility level in the visibility level field 610 includes a viewing user's user profile, then the viewing user may see the identified item, in an embodiment. Example visibility levels include everyone (i.e., all user profiles may see the identified item), connections only (i.e., user profiles connected with the creating user's user profile may see the identified item), default network (i.e., users in the same default network as the particular user may see the identified item), and invite only (i.e., the creating user chooses specific user profiles that may see the identified item). The time created field 612 indicates the time at which the item visibility entry 600 was created. The time updated field 614 indicates the time at which the item visibility entry 600 was last updated. In an alternate embodiment, the item visibility entry 600 may contain additional fields. For example, the item visibility entry 600 may specify differing anonymity levels depending on a group associated with a viewing user's user profile (e.g., a default network, a connection).

Ensuring Privacy

Figure 7:
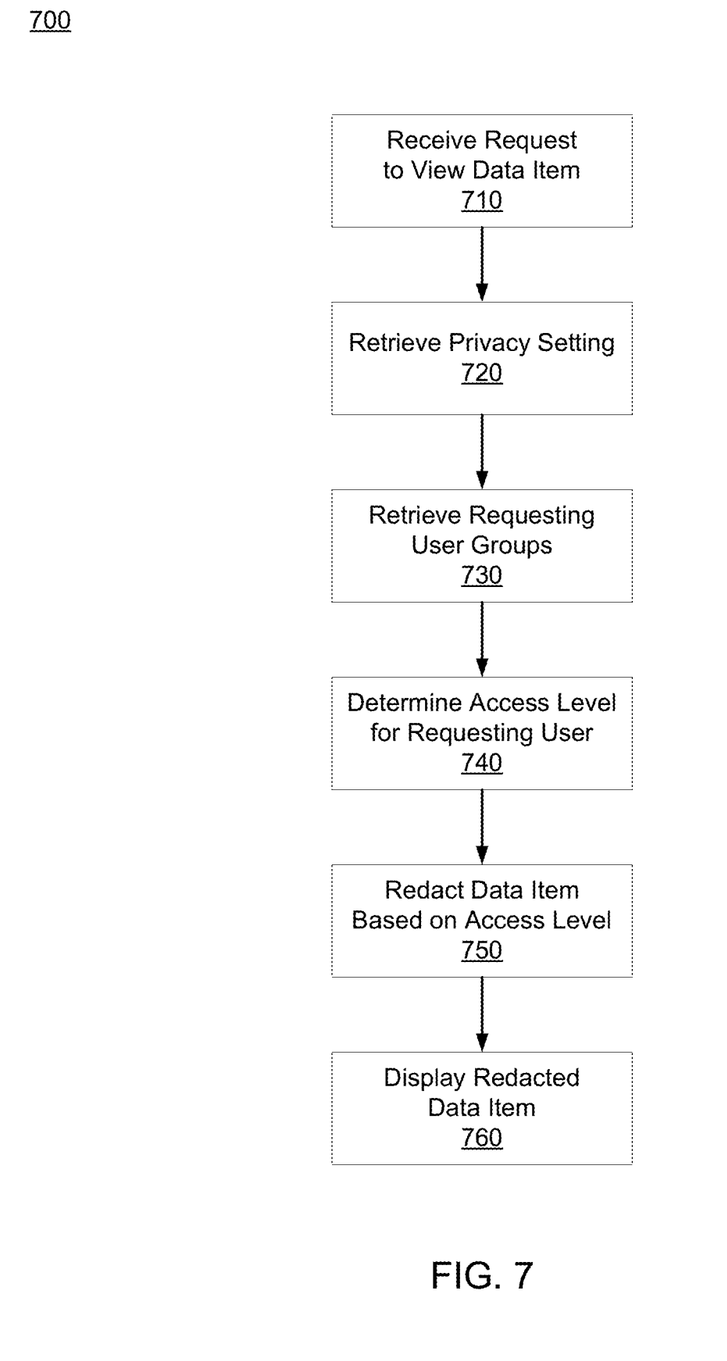
FIG. 7 illustrates a flow chart of an example process for displaying content while ensuring privacy in the default network computing system.

Referring now to FIG. 7, illustrated is a flow chart of an example process for displaying content while ensuring privacy in the default network computing system. The example privacy checking process 700 receives 710 a request to view a data item from a user profile, retrieves 720 a privacy setting associated with the requested data item, retrieves 730 groups associated with the requesting user profile, determines 740 an access level, redacts 750 the requested data item based the determined access level, and displays 760 redacted data item. In an embodiment, the privacy checking process 700 is implemented through the visibility engine 345. A request to view a data item may be received 710 from a user through the user interface engine 350 or through an application programming interface (API) associated with the default network computing system. Example data items may include an item such as an excerpted content item, a question, a referral, a request, or a discussion. Additional data items may include a user profile, a reputation ranking, or an interaction such as a comment, a like, a favorite, a rating, a share, a search, or a view.

One or more privacy settings associated with the requested data item are retrieved 720 from the profile visibility store 330 or the item visibility store 335. Privacy settings include visibility levels, anonymity levels, and other settings contained in a user's profile visibility entry 500. The one or more privacy settings retrieved depend on the data item. For an item, a privacy setting may be found in the item visibility store 335. For interactions with an item (e.g., a comment, a like, a favorite, a rating), a privacy setting may be inherited from the item associated with the interaction. For example, if an excerpted content item is visible to connections of a user profile that uploaded the excerpted content item, then comments on the excerpted content item are visible to the connections of the uploading user. Multiple privacy settings may be retrieved 720 in some instances. In one embodiment, privacy settings for an interaction with an item may be retrieved from the profile visibility store 330 (e.g., a privacy setting associated with the user profile that created the interaction) and the item visibility store 335. Example fields containing privacy settings (e.g., 504, 506, 508, 510, 512, 514, 608, and 610) are given in the profile visibility entry 500 and the item visibility entry 600.

Continuing the previous example, an additional privacy setting may be retrieved 720 from the profile visibility store associated with the user profile that commented on the excerpted content item. In the example, a combination of the retrieved privacy settings for the commenting user and the excerpted content item may determine 740 the access level for a requesting user profile and how the data content is redacted 750. In an embodiment, some data items may be associated with a privacy setting. For example, views or searches may be associated, either implicitly or explicitly, with a hidden setting, where a log of views and/or searches is not retrievable, or with a user only setting, where a log of views and/or searches may be viewed only by the user profile that made the views and/or searches. In an alternate embodiment, a user profile may voluntarily join user-organized groups of user profiles, which may be specified in a privacy setting.

Once one or more privacy settings are retrieved 720, user groups associated with the requesting user profile are retrieved 730. In one embodiment, user groups relevant to the one or more retrieved privacy settings are retrieved rather than all groups associated with the requesting user. For example, if a retrieved privacy setting concerns a default network, then one or more default networks associated with the requesting user profile are retrieved 730. If, for example, the retrieved privacy setting indicates that the visibility level associated with the data item is connections only, then the connections of the requesting user profile may be retrieved 730. In one embodiment, if the retrieved privacy setting indicates that the visibility setting is everyone, hidden, or user only, then no groups or connections are retrieved 730. In one embodiment, if the retrieved privacy setting is invitation only, then no groups or connections are retrieved 730.

Using the retrieved privacy settings and retrieved user groups, an access level is determined 740 for the requesting user profile. Example access levels may include full access, partial access, and no access. If a user profile has full access to an item, the user profile may see links to the item and may access data associated with the item. If a user profile has no access to an item, the user profile may not see links to the item or access data associated with the item. In an alternate embodiment, an access level may grant ability to see links to an item including identifying information (e.g., title, practice area) without granting access to data associated with the item (e.g., text content, comments). If the viewing user profile's retrieved groups and/or connections match the default networks, groups, and/or connections specified in the retrieved privacy setting, then the viewing user profile's access level may be determined 740 as full access or partial access. If a user profile does not have connections or membership in the associated group or default network, then a user profile's granted access level may be determined 740 as no access. Partial access indicates a partial level of access where a user profile may see data about an item without full access to data. In an embodiment, partial access may include many partial access levels granting varying levels of access to a data item. For example, if a user profile asks a question while remaining anonymous, viewing user profiles may be determined 740 to have partial access rather than full access because viewing user profiles may not access identifying data about the uploading user profile. In an embodiment, there may be conflicting privacy settings retrieved, which may be resolved based on privacy settings for a particular item taking precedence over default privacy settings from a user profile. For example, a user profile's anonymity level from the profile visibility store 330 may indicate non-anonymity, but the item's anonymity level from the item visibility store 335 may indicate full anonymity. In this example, the applicable privacy setting would be an anonymity level of full anonymity because the item-specific privacy setting supersedes the user profile's default privacy setting.

Based on the determined access level, the data item is redacted 750. If a viewing user profile is determined 740 to have a full access level, the data item may be presented without any data removed. If a viewing user profile is determined 740 to have no access level, the data item may be entirely obscured or hidden. For example, if a viewing user profile has no access to a particular user profile's reputation as specified by the profile visibility store 330, then the viewing user profile may not see the particular user profile in reputation rankings. If the viewing user profile is determined 740 to have a partial access level, then data are redacted 750 as directed by the partial access level. For example, if a retrieved privacy setting from the profile visibility store 330 specifies that a user profile should appear anonymous, then the user profile's location may be used in place of the user profile's name and company. As another example, if a particular user profile's contact detail privacy field indicates no access for other user profiles, then the particular user profile's contact details may be removed from the user profile for display to a user who may otherwise view the particular user's profile.

The redacted data item is presented for display 760 through the user interface engine 350. In an alternate embodiment, the redacted data item may be sent to fulfill a request unrelated to display (e.g., through an API associated with the default network computing system). In an embodiment, the privacy checking process 700 may be repeated multiple times to check multiple data items that may be prepared for display on a single webpage or interface. In an alternate embodiment, additional privacy settings may exist such as separate default privacy settings for different types of interactions. Privacy settings may be determined by users, or in an alternate embodiment inferred or set by the default network computing system. For example, privacy settings may vary according to the account type of the viewing user profile. As an example, a particular user profile may indicate a privacy setting of everyone for an excerpted content item, but user profiles with a basic account type may be given limited or no access unless they are connected to the particular user profile.

User Interface

Referring to FIGS. 8A-8G, illustrated is an example user interface for controlling privacy settings associated with a user profile in the default network computing system. The user privacy control interface 800 contains profile modification options 810, settings tabs 820, and privacy controls 830. The settings tabs 820 include a profile privacy settings tab 823, and the privacy controls 830 include an activity feed privacy setting 832, a profile image privacy setting 833, a connection privacy setting 834, a reputation privacy setting 837, an anonymity level setting 838, and a contact details privacy setting 839. The user interface engine 350, in an embodiment, may respond to inputs from a viewing user through the privacy control interface 800.

Figure 8A:
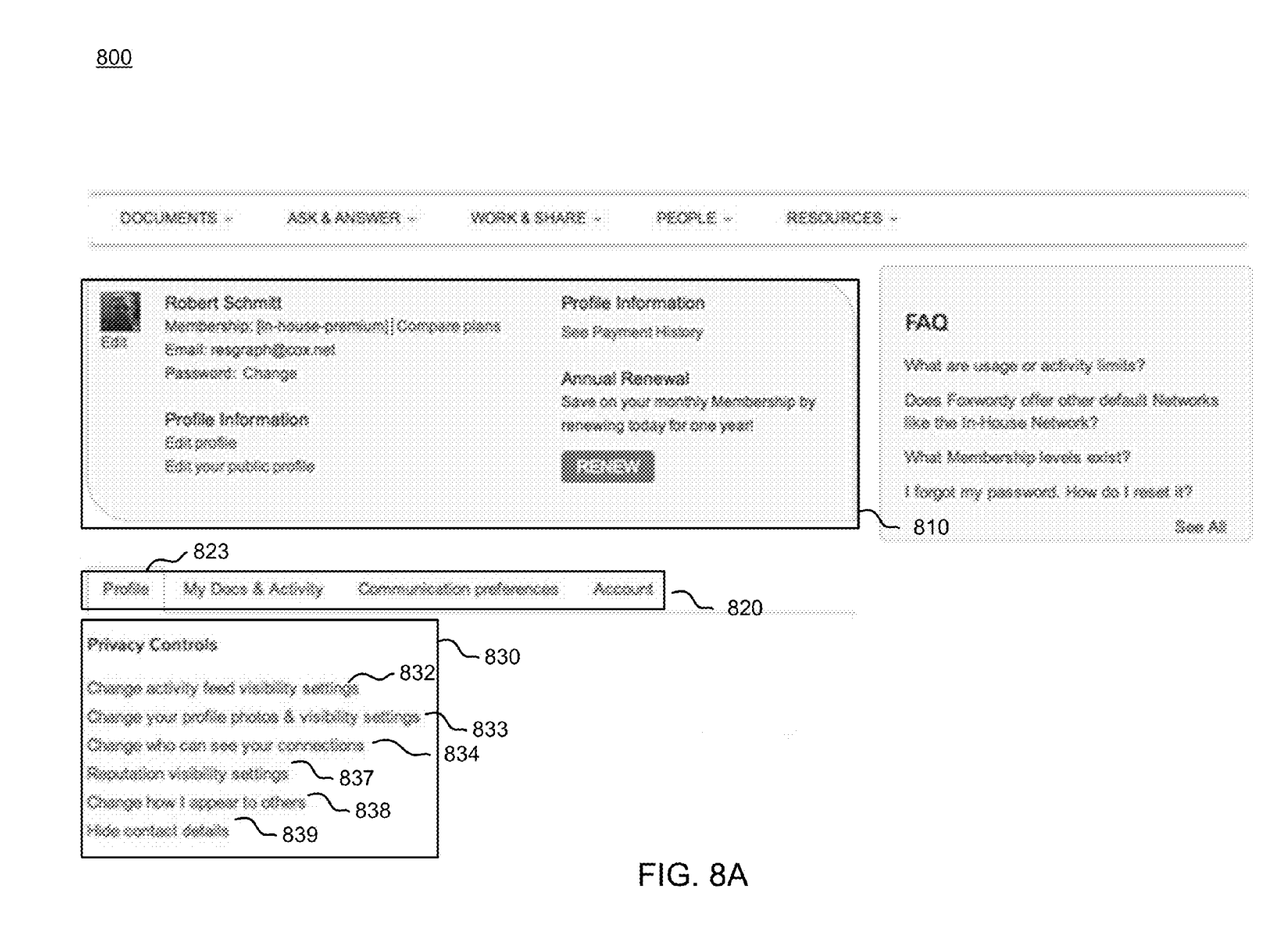
FIGS. 8A, 8B, 8C, 8D, 8E, 8F, and 8G illustrate an example user interface for controlling privacy settings associated with a user profile in the default network computing system.
Figure 8B:
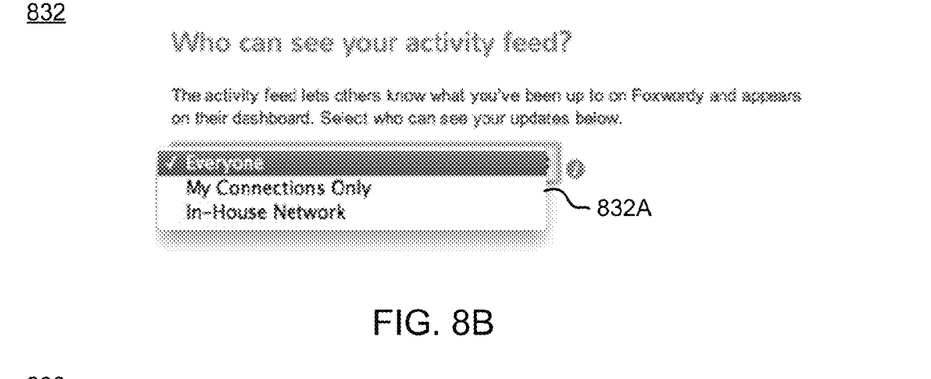

The profile modification options 810 list current information associated with the viewing user's profile as retrieved from the user profile store 305. A viewing user profile may modify or add information to the viewing user profile's entry in the user profile store 305. For example, the viewing user can change the user profile's password, edit user profile data, change payment options, or change a profile image. The profile image may appear on the corresponding user profile and may also appear next to the viewing user's identifying information in other interface of the default network system (e.g., next to an uploaded excerpted content item or a comment). The settings tabs 820 may be used to select different settings of options. One example set of options includes the profile privacy settings tab 823, but others may include settings relating to interactions and excerpted content, communication preferences, and the viewing user's user profile. Communication preferences may indicate which user profiles may contact the viewing user (e.g., through the default networking computer system, through an email, through a connection request) as well as what automated communications the viewing user may receive from the default network computing system (e.g., email digests of recent interactions by user profiles connected with the viewing user profile or responses to excerpted content uploaded by the viewing user profile). Account preferences may include payment settings and options to change account type.

When the profile privacy settings tab 823 is selected, the privacy controls 830 may be shown. Selecting the activity feed privacy setting 832 opens a submenu, shown in FIG. 8B. The submenu includes an activity feed privacy selector 832A. In the example shown, the activity feed privacy selector 832A contains privacy settings including everyone, connections only, and default network. A privacy setting selected by a user from the activity feed privacy selector 832A may be stored in the activity feed privacy field 504. In an alternate embodiment, additional privacy settings may be available. Activity feeds for user profiles that are determined to have access according to the selected privacy setting may include interactions and excerpted content items posted by the viewing user.

Figure 8C:
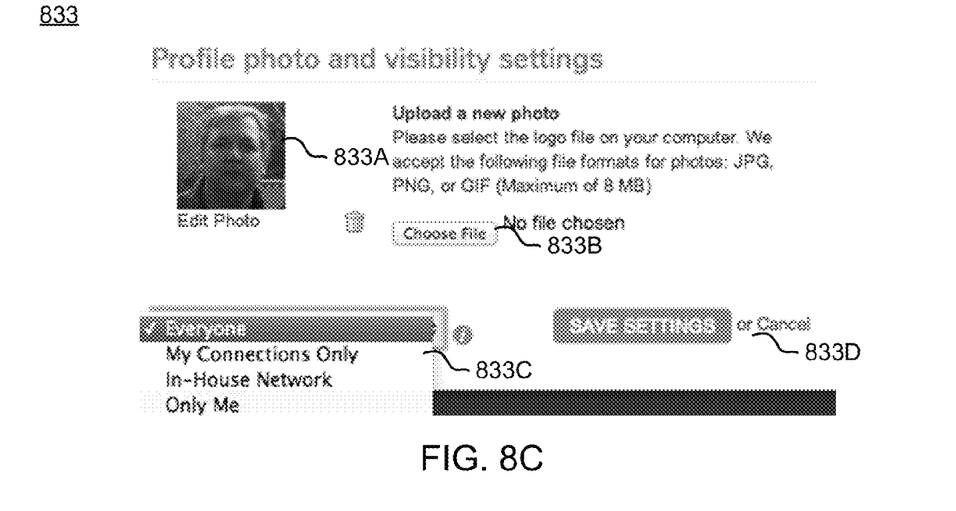

Selecting the profile image privacy setting 833 opens a submenu, shown in FIG. 8C. The submenu includes a current profile image 833A, a profile image upload button 833B, a profile image privacy selector 833C, and profile image submission buttons 833D. The current profile image 833A indicates a current image associated with a user profile. Example image formats include Joint Photographic Experts Group (JPEG) format, Portable Network Graphics (PNG) format, Graphics Interchange Format (GIF). In an alternate embodiment, other image formats such as Tag Image File Format (TIFF) or bitmap image file (BMP) format. The profile image upload button 833B may be selected to choose an image file for use as a profile image. An uploaded profile image may be stored in the user profile store 305. In the example shown, the profile image privacy selector 833C contains privacy settings including everyone, connections only, default network, and user only. In an alternate embodiment, additional privacy settings may be available. The profile submission buttons 833D are used to save changes to the profile image privacy setting 833 or discard changes. If the submit button is selected, the selected privacy setting from the profile image privacy selector 833C may be stored in the picture privacy field 506.

Figure 8D:
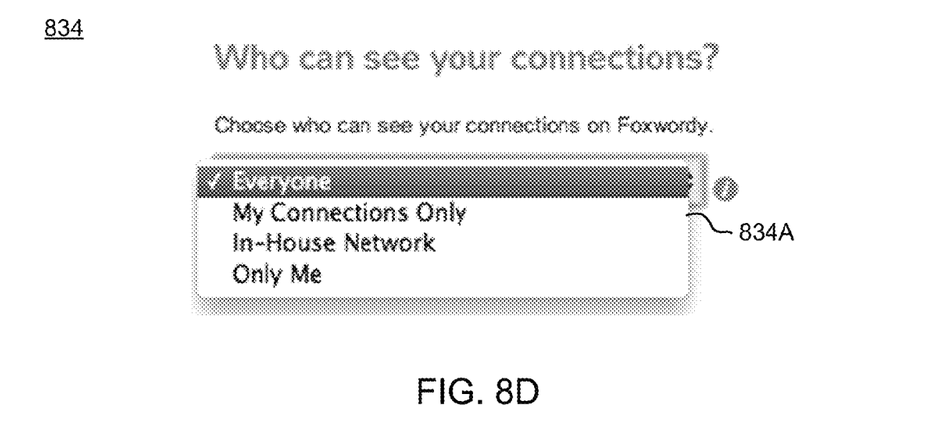

Selecting the connection privacy setting 834 opens a submenu, shown in FIG. 8D. The submenu includes a connection privacy setting selector 834A. In the example shown, the profile image privacy selector 834A contains privacy settings including everyone, connections only, default network, and user only. A privacy setting selected by a user from the connection privacy setting selector 834A may be stored in the connection privacy field 508. In an alternate embodiment, additional privacy settings may be available. User profiles that are determined to have access according to the selected privacy setting may see connections of the viewing user profile, (e.g., in the viewing user's profile page, or as connection suggestions based on the viewing user profile's connection).

Figure 8E:
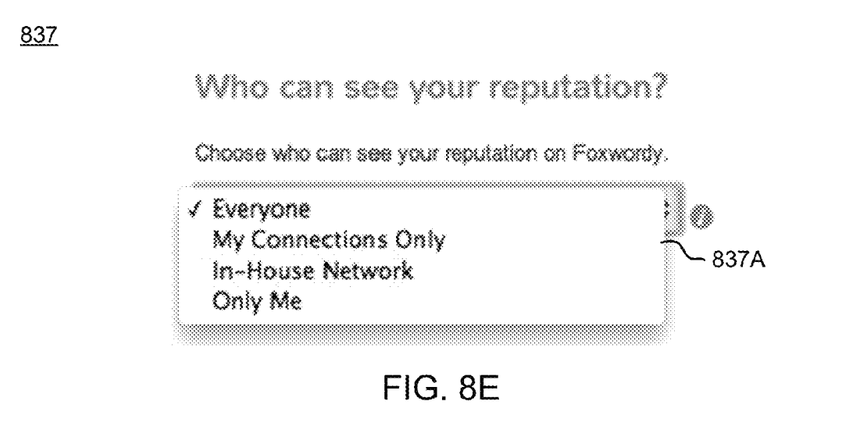

Selecting the reputation privacy setting 837 opens a submenu, shown in FIG. 8E. The submenu includes a reputation privacy setting selector 837A. In the example shown, the reputation privacy setting selector 837A contains privacy settings including everyone, connections only, default network, and user only. A privacy setting selected by a user from the reputation privacy setting selector 837A may be stored in the reputation privacy field 510. In an alternate embodiment, additional privacy settings may be available.

Figure 8F:
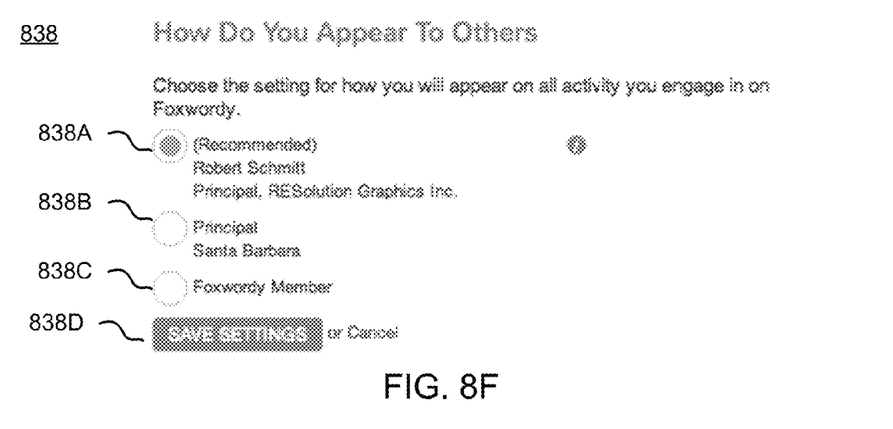

Selecting the anonymity level setting 838 opens a submenu, shown in FIG. 8F. The submenu includes a non-anonymity selection 838A, a partial anonymity selection 838B, a full anonymity selection 838C, and an anonymity setting submission button 838D. Anonymity levels are used as the default settings governing how much identifying information other user profiles may see about a user profile's interactions in the default network. In an embodiment, a user may select a different anonymity level from the default selected in the anonymity level setting 838. The non-anonymity selection 838A grants a viewing user profile visibility to the selecting user profile's name, title, and company, in one embodiment. The partial anonymity selection 838B grants a viewing user profile visibility to the selecting user profile's title and location, in one embodiment. The full anonymity selection 838C does not grant a viewing user profile visibility to the selecting user profile's identifying or personal information. Selecting the anonymity setting submission button 838D may store the selected anonymity level (from 838A, 838B, or 838C) to the anonymity level field 512. In an alternate embodiment, additional anonymity levels may be available granting a viewing user profile visibility to different combinations of identifying information from the user profile store 305.

Figure 8G:
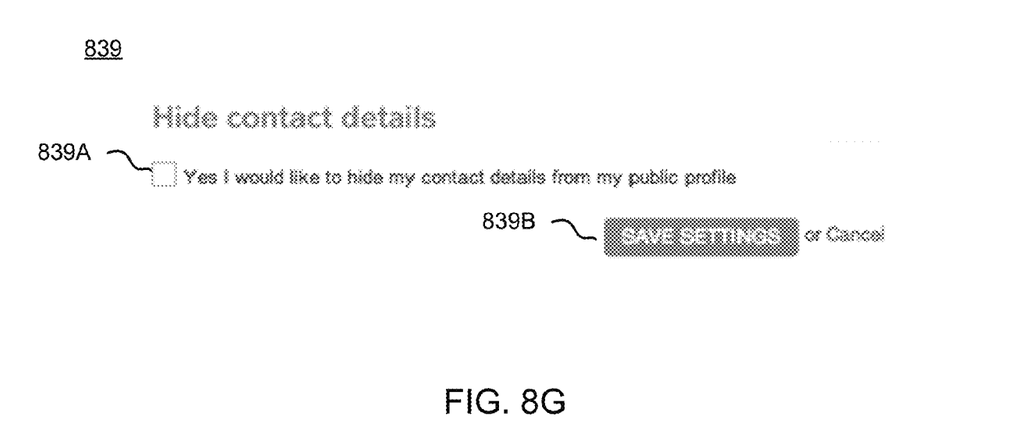

Selecting the contact details privacy setting 839 opens a submenu, illustrated in FIG. 8G. The submenu includes a contact details privacy selection 839A and a contact details privacy submission button 839B. A user may select the contact details privacy selection 839A to hide contact details from a profile page, or the user may unselect the contact details privacy selection 839A to make contact details visible in a profile page. Contact details may include personal and/or professional mailing address, physical address, email address, phone number, fax number, or other information from the user profile store. In an alternate embodiment, a user may selectively hide different contact details (e.g., hiding a personal email while leaving a professional email public). In an alternate embodiment, a user may choose particular groups of user profiles that may view contact details. For example, a user may choose to hide contact details from everyone but allow the user profile's connections and default network to view contact details. When a user selects the contact details privacy submission button 839B, the user's selection may be stored to the contact detail privacy field 514.

Figure 9:
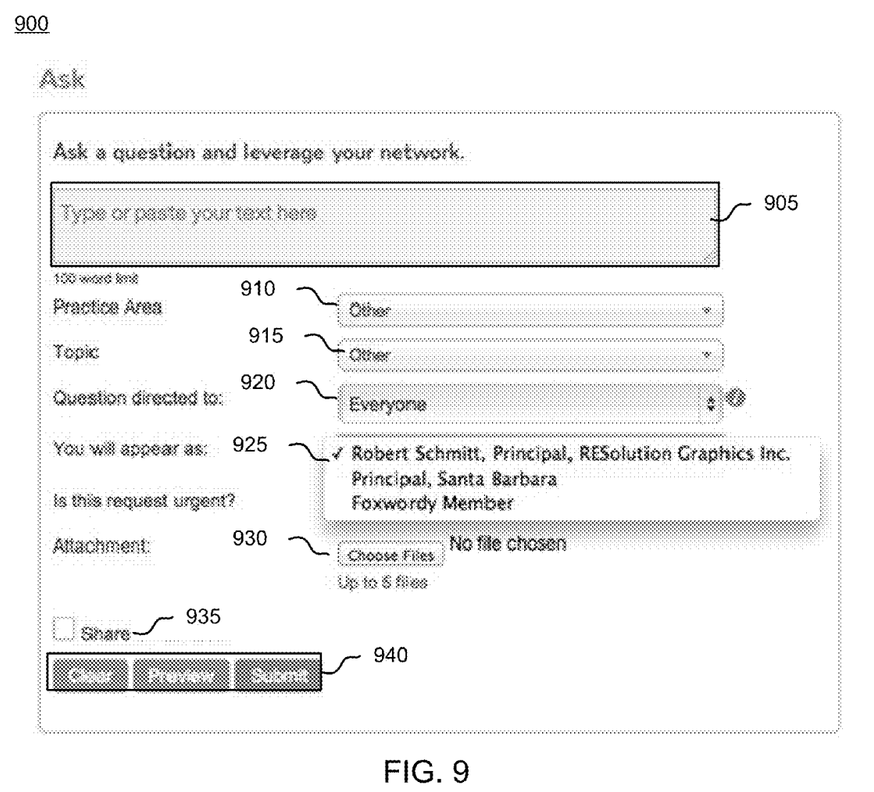
FIG. 9 illustrates an example user interface for interacting with users of the default network computing system.

Referring to FIG. 9, illustrated is an example user interface for interacting with user profiles through the default network computing system using a question. The question interface 900 includes a text input field 905, a practice area selector 910, a topic selector 915, a privacy selector 920, an anonymity selector 925, an attachment selector 930, a social network sharing option 935, and submission buttons 940. The interaction interface 900 also includes an urgency selector, which is partially occluded in FIG. 9. In one embodiment, there may be additional interfaces for requests, referrals, answers, and/or discussions similar to the question interface 900.

An interacting user uses the text input field 905 to communicate the interacting user's question to the default network. The text may be entered into the textbox using the alphanumeric input device 112, a copy and paste functionality, or a drag-and-drop functionality. Although the example question interface 900 has a 100-word limit on the text input field 905, another embodiment may have a different limit or no limit on the amount of text in the text input field 905. The interacting user may select a practice area from the practice area selector 910 as well as a topic from the topic selector 915. In one embodiment, the interacting user chooses a practice area and a topic from a list, but in an alternate embodiment, the interacting user may input a practice area or topic into a text input field. In one embodiment, the practice area selector 910 and topic selector 915 are used for indexing and/or filtering search results containing interactions.

The interacting user may choose a privacy setting from the privacy selector 920, which controls which user profiles may see the question. Example privacy settings include everyone, connections only, default network, and colleagues. The privacy setting from the privacy selector 920 may be stored in the visibility level field 610. The interacting user may choose an anonymity level from the anonymity selector 925, which controls what identifying information from the interacting user is associated with the question. Example anonymity levels include full anonymity, partial anonymity, and non-anonymity. The anonymity level from the anonymity selector 925 may be stored in the anonymity level field 608.

The interacting user may include one or more attachment files to the question using the attachment selector 930, or may omit including attachment files. The attachment files may be uploaded from the client device 210, a network server 230, or another computer system to which the interacting user profile has access. In one embodiment, the number of attachment files is limited to five, but in an alternate embodiment, there is a different limit or no limit on attachment files. The interacting user may select the social network option 935 to cross-post the question to another social networking site (e.g., LINKEDIN, FACEBOOK, GOOGLE PLUS). The interacting user may use the submission buttons 940 when the previously described fields are filled. The clear button allows a user to leave the question interface 900 without submitting entered information. The preview button may be used to see a prepublication version of the question. The submit button publishes the question for viewing by user profiles of the default network computing system. Use of the submit button may store information entered to the question interface 900 in the interaction store 340.

Figure 10:
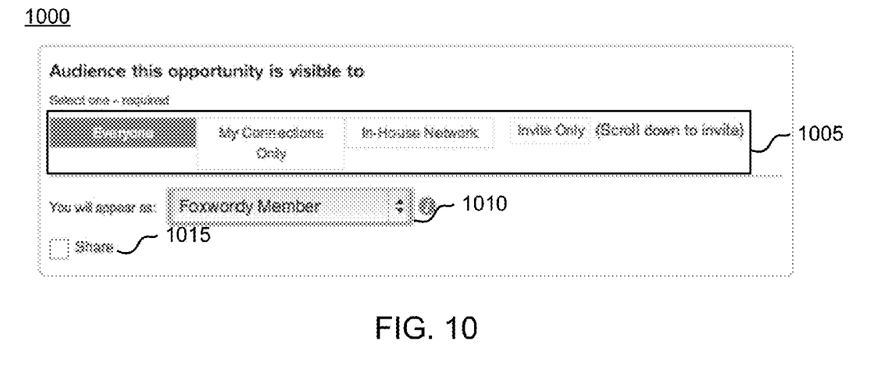
FIG. 10 illustrates an example user interface for controlling privacy and access to a data item in the default network computing system.

Referring to FIG. 10, illustrated is an example user interface for controlling privacy and access to a data item in the default network computing system. The interaction privacy interface 1000 includes a privacy selector 1005, an anonymity selector 1010, and a social network option 1015. The interaction privacy interface 1000 may be used for choosing privacy and anonymity levels to apply to a data item (e.g., an excerpted content item, a question, a request, a referral, a discussion, an answer).

The interacting user may choose a privacy setting from the privacy selector 1005, which controls which user profiles may see the item. Example privacy settings include everyone, connections only, default network, and invite only (e.g., the interacting user chooses one or more particular user profiles that may view the item). In an alternate embodiment, privacy settings may include colleagues. The privacy setting from the privacy selector 1005 may be stored in the visibility level field 610. The interacting user may choose an anonymity level from the anonymity selector 1010, which controls what identifying information from the interacting user profile is associated with the item. Example anonymity levels include full anonymity, partial anonymity, and non-anonymity. The anonymity level from the anonymity selector 1010 may be stored in the anonymity level field 608. The interacting user may select the social network option 1015 to cross-post the item to another social networking site (e.g., LINKEDIN, FACEBOOK, GOOGLE PLUS).

Additional Considerations

The disclosed embodiments beneficially allow for discretely interacting in a default social networking environment. Users may ensure that data items are viewed by users with the rights to use them. For example, if an interaction relates to a confidential internal memorandum, a user may choose privacy settings granting access to user profiles having the same company listed as the uploading user profile. Additionally, users may guard their identities in situations where non-anonymity may be inappropriate or risky. For example, professionals from different companies may informally discuss a matter in anonymity without fear of professional liability for giving advice without insufficient information or a formal relationship. Combining these anonymity and privacy features to the default network features enables users to interact discretely with others having similar occupations that they may not have met through traditional networking channels.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for controlling access to content in a default network based on user attributes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for controlling access to data items in a default network computing system, the method comprising:
   receiving, from a client device of a requesting user profile of the default network computing system, a request for display of a data item uploaded by an author user profile, the author user profile associated with a plurality of attributes and a default network comprising user profiles selected for inclusion in the default network in response to the user profiles being associated with default network attributes including industry practice area and account type;
   retrieving, from the default network computing system, a privacy setting specifying a visibility level of the requested data item for user profiles in the default network;
   retrieving, through the default network computing system, one or more user profile groups associated with the requesting user profile, the one or more user profile groups including the default network;
   determining, through the default network computing system, an access level for the requesting user profile based on the visibility level specified in the retrieved privacy setting for user profiles in the default network;
   redacting, through the default network computing system, the requested data item as specified by the determined access level; and
   providing the redacted data item for display by the client device of the requesting user profile of the default network computing system.

2. The computer-implemented method of claim 1,
   wherein determining the access level for the requesting user comprises determining that the requesting user profile has no access to the requested data item in response to the requesting user profile not being included in the default network, and
   wherein providing for display the redacted data item comprises providing a link to the data item including identifying information about the data item without granting access to text content and comments on the redacted data item in response to determining that the requesting user profile has no access to the requested data item.

3. The computer-implemented method of claim 1,
   wherein determining the access level for the requesting user profile comprises determining that the requesting user profile has partial access to the requested data item in response to the requesting user profile being included in the default network, and
   wherein redacting the requested data item comprises replacing a name and company included in the author user profile with a location included in the author user profile.

4. The computer-implemented method of claim 1, wherein the default network attributes include location, industry practice area, and account type and further include one or more selected from a group consisting of sub-industry, expertise, occupation, employer, and any combination thereof.

5. The computer-implemented method of claim 1, wherein redacting the requested data item comprises removing data selected from a group consisting of at least one of content author name, content author location, content author employer, content author practice area, content author account type, content author title, content title, content description, content comments, content tags, content description, and any combination thereof.

6. The method of claim 1,
wherein determining the access level for the requesting user profile comprises determining that the requesting user profile has partial access to the requested data item in response to the requesting user profile being included in the default network, and
wherein redacting the requested data item comprises removing identifying information about the author user profile.

7. The method of claim 1, wherein determining the access level for the requesting user profile comprises determining the access level based on an item access level associated with the data item superseding a default access level retrieved from the author user profile.

8. A computer-implemented method for controlling access to data items in a default network computing system, the method comprising:
receiving, from a client device associated with a requesting user profile, a request for display of a data item uploaded by an author user profile associated with a plurality of attributes and a default network comprising user profiles selected for inclusion in the default network in response to the user profiles being associated with default network attributes including industry practice area and account type;
retrieving a privacy setting specifying a visibility level of the requested data item for user profiles in the default network;
retrieving one or more user profile groups associated with the requesting user profile, the one or more user profile groups including the default network;
determining an access level for the requesting user profile based on the visibility level specified in the retrieved privacy setting for user profiles in the default network;
redacting, the requested data item as specified by the determined access level; and
providing the redacted data item for display by the client device.

9. The computer-implemented method of claim 8,
wherein determining the access level for the requesting user comprises determining that the requesting user profile has no access to the requested data item in response to the requesting user profile not being included in the default network, and
wherein providing for display the redacted data item comprises providing a link to the data item including identifying information about the data item without granting access to text content and comments on the redacted data item in response to determining that the requesting user profile has no access to the requested data item.

10. The computer-implemented method of claim 8,
wherein determining the access level for the requesting user profile comprises determining that the requesting user profile has partial access to the requested data item in response to the requesting user profile being included in the default network, and wherein redacting the requested data item comprises replacing a name and company of the author user profile with a location of the author user profile.

11. The computer-implemented method of claim 8, wherein the default network attributes include location, industry practice area, and account type and further include one or more selected from a group consisting of sub-industry, expertise, occupation, employer, and any combination thereof.

12. The computer-implemented method of claim 8, wherein redacting the requested data item comprises removing data selected from a group consisting of at least one of content author name, content author location, content author employer, content author practice area, content author account type, content author title, content title, content description, content comments, content tags, content description, and any combination thereof.

13. The method of claim 8,
wherein determining the access level for the requesting user profile comprises determining that the requesting user profile has partial access to the requested data item in response to the requesting user profile being included in the default network, and
wherein redacting the requested data item comprises removing identifying information about the author user profile.

14. The method of claim 8, wherein determining the access level for the requesting user profile comprises determining the access level based on an item access level associated with the data item superseding a default access level retrieved from the author user profile.

15. A non-transitory computer-readable medium configured to store instructions, the instructions when executed by a processor cause the processor to:
receive, from a client device associated with a requesting user profile, a request for display of a data item uploaded by an author user profile associated with a plurality of attributes and a default network comprising user profiles selected for inclusion in the default network in response to the user profiles being associated with default network attributes including industry practice area and account type;
retrieve a privacy setting specifying a visibility level of the requested data item for user profiles in the default network;
retrieve one or more user profile groups associated with the requesting user profile, the one or more user profile groups including the default network;
determine, an access level for the requesting user profile based on the visibility level specified in the retrieved privacy setting for user profiles in the default network;
redact, the requested data item as specified by the determined access level; and
provide the redacted data item for display by the client device.

16. The computer-readable medium of claim 15,
wherein determining the access level for the requesting user comprises determining that the requesting user profile has no access to the requested data item in response to the requesting user profile not being included in the default network, and
wherein providing for display the redacted data item comprises providing a link to the data item including identifying information about the data item without granting access to text content and comments on the redacted data item in response to determining that the requesting user profile has no access to the requested data item.

17. The computer-readable medium of claim 15,
wherein determining the access level for the requesting user profile comprises determining that the requesting user profile has partial access to the requested data item in response to the requesting user profile being included in the default network, and
wherein redacting the requested data item comprises replacing a name and company of the author user profile with a location of the author user profile.

18. The computer-readable medium of claim 15, wherein the default network attributes include location, industry practice area, and account type and further include one or more selected from a group consisting of sub-industry, expertise, occupation, employer, and any combination thereof.

19. The medium of claim 15,
wherein determining the access level for the requesting user profile comprises determining that the requesting user profile has partial access to the requested data item in response to the requesting user profile being included in the default network, and
wherein redacting the requested data item comprises removing identifying information about the author user profile.

20. The medium of claim 15, wherein determining the access level for the requesting user profile comprises determining the access level based on an item access level associated with the data item superseding a default access level retrieved from the author user profile.

* * * * *